United States Patent [19]

Harmon

[11] 3,930,086

[45] Dec. 30, 1975

[54] APERTURED NONWOVEN FABRICS

[75] Inventor: Carlyle Harmon, Provo, Utah

[73] Assignee: Johnson & Johnson, New Brunswick, N.J.

[22] Filed: June 12, 1974

[21] Appl. No.: 478,668

Related U.S. Application Data

[60] Continuation-in-part of Ser. No. 326,715, Jan. 26, 1973, abandoned, which is a division of Ser. No. 104,174, Jan. 5, 1971, Pat. No. 3,741,724.

[52] U.S. Cl. ............... 428/131; 8/115.5; 19/161 P; 28/1.2; 28/76; 428/369; 206/.5
[51] Int. Cl.² ..................... B32B 3/10; D02G 1/10
[58] Field of Search .......... 161/109, 169; 19/161 P; 8/130.1, 115.5, DIG. 10, 114.5, 115; 428/357, 369, 134, 135, 131

[56] References Cited

UNITED STATES PATENTS

| | | | |
|---|---|---|---|
| 2,468,464 | 4/1949 | Salfisberg | 206/.5 |
| 2,698,082 | 12/1954 | Maloney | 206/.5 |
| 2,862,251 | 12/1958 | Kalwaites | 161/169 |
| 2,977,183 | 3/1961 | Osugi et al. | 8/130.1 |
| 3,218,381 | 11/1965 | Such et al. | 19/161 P |
| 3,512,230 | 5/1970 | Luzzatto | 28/1.2 |
| 3,595,738 | 7/1971 | Clarke et al. | 161/169 |

*Primary Examiner*—George F. Lesmes
*Assistant Examiner*—R. J. Roche

[57] ABSTRACT

Apertured nonwoven textile fabrics comprising polyvinyl alcohol fibers and having a predetermined pattern of fabric apertures and fiber bundles created by applied fluid forces.

3 Claims, No Drawings

APERTURED NONWOVEN FABRICS

This patent application is a continuation-in-part of copending patent application Ser. No. 326,715, filed on Jan. 26, 1973 now abandoned which, in turn, is a division of copending patent application Ser. No. 104,174 which was filed on Jan. 5, 1971, now U.S. Pat. No. 3,741,724.

This invention relates to apertured nonwoven fabrics having a predetermined pattern of fabric apertures and fiber bundles comprising polyvinyl alcohol fibers.

Polyvinyl alcohol fibers are obtainable, for example, by dry or wet extruding or spinning from their aqueous solutions and, by definition, are composed of at least about 50% by weight of vinyl alcohol units ($-CH_2-CHOH-$)$_n$ and in which the total of the vinyl alcohol units and any one or more of the various acetal units is at least about 85% by weight of the fiber.

The simplest molecular structure of polyvinyl alcohol is therefore seen as idealistically possessing the following characteristic polymer chain, of which five typical units are shown, as follows:

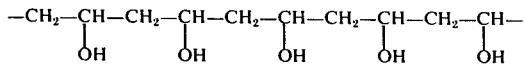

Inasmuch as the vinyl alcohol molecule as shown is unknown as a monomer, polyvinyl alcohol is usually prepared by polymerization of vinyl acetate into polyvinyl acetate, followed by conversion by alcoholysis, hydrolysis, saponification, or the like, to polyvinyl alcohol.

It is therefore to be appreciated that the above structural formula assumes (primarily for illustrative purposes) the substantially complete alcoholysis, hydrolysis, saponification, or other conversion of the polyvinyl acetate into polyvinyl alcohol. This assumption of 100% conversion, will be followed throughout this disclosure to simplify the chemistry involved and is not intended to limit the scope of the applicability of the inventive concept.

Polyvinyl alcohol fibers are naturally strong and abrasion resistant and have high resistance to chemicals, including acids and alkalis. Resistance to fungi, mildew, and insects is good. Polyvinyl alcohol fibers, can be manufactured at relatively low cost and have many excellent physical and chemical properties and characteristics. Unfortunately, however, such fibers, as they are originally produced, have an undesirable sensitivity to heat and water, and particularly to hot water. Specifically, if they are immersed in water at room temperature, they shrink by more than about 10%, and if they are immersed in hot water at a temperature of about 65° C., they become soluble and dissolve.

Such heat-sensitive, water-soluble polyvinyl alcohol fibers have some utility in the textile and related industries but have very little applicability in the manufacture of apertured nonwoven textile fabrics by the well-known fluid techniques described in U.S. Pat. No. 2,862,251 which issued Dec. 2, 1958 to F. Kalwaites. Efforts to utilize such heat-sensitive, water-soluble polyvinyl alcohol fibers in the apparatus illustrated, for example, in FIGS. 7–12 of this patent, have lead to completely undesirable results which come about especially when the heat-sensitive, water-soluble polyvinyl alcohol fibers are exposed to the applied fluid forces during their movement and manipulation into the predetermined patterns of the desired fabric apertures and fiber bundles.

In order to overcome such shortcomings, the freshly spun polyvinyl alcohol fibers have been subjected to heat treatments, usually in the range of from about 200° to about 250° C. whereby their wet softening temperature, that is, by definition, the temperature at which the fibers shrink 10% of their original length, can be raised to a range of from about 60° to about 100° C. Unfortunately, however, although the fibers have far less heat sensitivity, they are still essentially water-soluble and will still dissolve in hot water at a temperature of about 110° C.

However, if the heat-treated fibers are further subjected to an insolubilizing or a cross-linking operation by treatment with aldehydes, such as an acetalization by means of formaldehyde, their wet softening temperature can be raised to a value in excess of about 150° C. Additionally, they become less water sensitive and they do not dissolve in water at such temperature.

It is not essential, however, that the wet softening temperature of the fibers always be raised to a value in excess of about 150°C., such as when the temperature of any subsequent processing does not reach that temperature. An increase in the wet softening temperature of the fibers to a value of 150°C. merely provides a margin of safety which is not required or necessary under such circumstances. Under many circumstances, therefore, sufficient margin of safety is provided if the fibers are capable of meeting the herein previously-mentioned standard of no longer being essentially-water-soluble and not dissolving in hot water at a temperature of about 110°C.

This, of course, is extremely important not only during the subsequent manufacture of the fibrous product itself when it is exposed to subsequent hot water processing, but also when the resulting finished product is used in the presence of hot water at the boiling point and steam associated therewith usually at a temperature of 100°C. or slightly higher. An outstanding example of such an elevated temperature use of such a product is an infusion container or bag such as used in the brewing or preparation of tea, or coffee, or other beverages.

The previously described heat treatment and insolubilizing process of the polyvinyl alcohol fibers affect the dry heat softening temperature as well as the wet softening temperature of the fibers. These steps raise the value of the dry heat softening temperature in excess of about 210°C, i.e., the fibers will not dissolve in dry heat at that temperature.

Unfortunately, when efforts are made to form these heat treated and acetalized heat-insensitive, water-insoluble polyvinyl alcohol fibers into fibrous webs by exposure to the fluid processing and manipulation involved in the manufacture of apertured nonwoven textile fabrics, as described in the above-mentioned patent, the results are still unsuccessful. The polyvinyl alcohol fibers do not make completely satisfactory fibrous webs and, although the fibers do not dissolve when treated by the fluid techniques of the above-described patent, they do not make commercially satisfactory apertured nonwoven textile fabrics.

The reasons for such lack of success have now been discovered and the purpose and object of this inventive concept is to disclose and illustrate methods for successfully manufacturing commercially acceptable apertured nonwoven textile fabrics from polyvinyl alcohol fibers by the above-mentioned fluid processes.

It has been discovered that apertured nonwoven textile fabrics having a predetermined pattern of fabric apertures and fiber bundles can be successfully made from polyvinyl alcohol fibers by the fluid processing techniques of the above-described patent if such fibers possess specific chemical and physical properties and characteristics which can be built into them by selective manufacturing and processing techniques. These specific chemical and physical properties and characteristics which are necessary require that the fibers have an average degree of acetalization of from about 20 mol % to about 35 mol % whereby they develop the necessary balance of hydrophobic-hydrophilic properties and are sufficiently heat-insensitive and water-insoluble as to be capable of controlled movement and manipulation by the applied fluid forces used in the processes of said patent. Additionally, the heat-insensitive and water-insoluble fibers are to be given a crimping treatment whereby from about six crimps to about 16 crimps are formed in the fibers and they are thus rendered more amenable to the formation of fibrous webs which are cohesive, do not split, and are well adapted for fluid processing into apertured nonwoven textile fabrics by applied fluid forces.

Although the present inventive concept will be described with reference to heat-insensitive, water-insoluble polyvinyl alcohol fibers which have been subjected to a specific heat treatment at a selected temperature range to improve their resistance to heat shrinking and a subsequent cross-linking or acetalization preferably with formaldehyde to improve their resistance to water-sensitivity, it is to be appreciated that other processing techniques can be resorted to in order to create the desired and necessary physical and chemical properties and characteristics.

This is particularly true of the cross-linking or insolubilizing step wherein a large number of other insolubilizing agents are of use. Such other insolubilizing or acetalizing agents include other aldehydes, both aliphatic and aromatic, such as acetaldehyde, propionaldehyde, n-butyraldehyde, isobutyraldehyde, n-valeraldehyde, isovaleraldehyde, n-caproaldehyde, n-heptaldehyde, stearaldehyde, acrolein, crotonaldehyde, benzaldehyde, furfural, naphthaldehyde, etc. Substituted aldehydes are also of use and include chloroacetaldehyde, bromoacetaldehyde, chlorobenzaldehyde, nitro-benzaldehyde, hexahydrobenzaldehyde, etc.

Aminoaldehydes are also of use and include aminoacetaldehyde, beta-amino-propionaldehyde, beta-aminobutyraldehyde, the isomeric amono valeraldehydes, cyclohexylaminoacetaldehyde, beta-(amino-ethoxy) acetaldehyde, N-methyl-amino-acetaldehyde, N-ethyl-amino-acetaldehyde, N-methyl-amino-propionaldehyde, beta-N-methyl-aminobutyraldehyde, etc.

Dialdehydes, which are bi-functional, similarly, are of use and include glyoxal, succinaldehyde, malonaldehyde, glutaraldehyde, terephthal-aldehyde, etc.

However, regardless of the particular heat treatment employed or the specific aldehydes selected for the insolubilizing treatment, the average degree of acetalization or the mol % of hydroxy groups which are reacted with the selected aldehyde is in the range of from about 20 mol % to about 35 mol %.

The following molecular structure is shown to illustrate polyvinyl alcohol in which 20 mol % of the hydroxy groups are reacted, for this particular segment of the polymer chain:

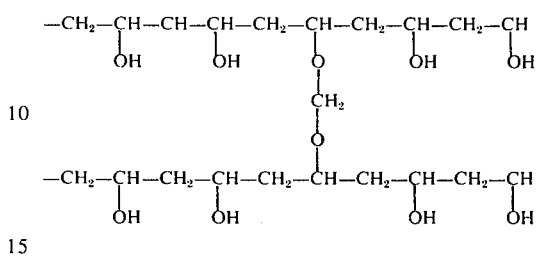

The molecular structure is idealistically shown in its simplest form and it is to be appreciated that many other similar ether linkages are possible. Additionally, other types of ether linkages are possible, such as, for example, a cyclic ether linkage between adjacent hydroxy groups on the same polymer chain. Such can be, illustrated as follows, showing a 40 mol % acetalization for this particular segment of the polymer chain:

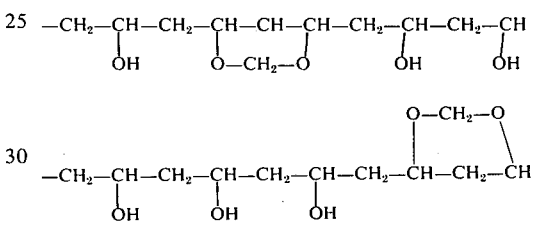

When the polyvinyl alcohol fibers have an average degree of acetalization of from about 20 mol % to about 35 mol %, they develop the necessary balance of hydrophobic-hydrophilic properties and are sufficiently heat-insensitive and water-insoluble, as to be capable of controlled movement and manipulation by the applied fluid forces which are employed in the process described in the patent to rearrange the individual fibers into a predetermined pattern of fabric apertures and fiber bundles.

Average degrees of acetalization which are definitely above about 35 mol % are not desirable inasmuch as such degrees of acetalization tend to possess too much hydrophobicity and tend to resist the desired movement and rearrangement by the applied fluid forces. Also, average degrees of acetalization which are definitely below about 20 mol % are not desirable as such degrees of acetalization tend to possess too much hydrophilicity and tend to be too water-sensitive or water-soluble.

The average degree of acetalization is noted as also having an inverse effect upon the moisture regain of the polyvinyl alcohol fibers. This is evidenced in the following Table, developed at 40° C. and a Relative Humidity of 90%:

TABLE I

| Mol % Acetalization | % Moisture Regain |
|---|---|
| 10 | 11 |
| 20 | 10 |
| 32 | 8 |
| 40 | 7½ |
| 60 | 7 |
| 70 | 6 |

Additionally, in order that a fibrous web be formed which is sufficiently cohesive and self-sustaining and does not split apart during conventional commercial handling and processing, crimps are formed in the fibers, preferably subsequent to the heat treatment and insolubilizing step and, of course, prior to the formation of the fibrous web.

The number of crimps per inch of fiber will vary according to the denier and length of the fiber, upon the nature, shape and amplitude of the crimp itself, and other related factors. From about six crimps per inch to about 16 or more crimps per inch is satisfactory, with a preferred commercial range extending from about eight crimps per inch to about 12 crimps per inch.

These crimps may be obtained in many ways, such as, for example, mechanically, as by passage of the fibers through intermeshing heated gears. The particular nature, shape, and amplitude of the crimps is controlled by the nature and shape of the teeth or intermeshing elements, of the heated intermeshing gears and by the depth to which these gears intermesh. Other crimping techniques may, of course, be utilized.

Although the invention will be described and illustrated with particular reference to starting fibrous materials comprising carded webs in which the individual fibers are generally oriented in the machine or long direction, it is to be appreciated that such is done because the invention is of primary importance in connection with such carded or oriented webs.

However, the inventive concept is also applicable to other types of starting fibrous materials. One such type is the so-called "isotropic" web formed by air-laying techniques in which the fibers are disposed at random and are not oriented in any particular direction.

Still another aspect of the present invention is its application to fibrous webs made basically by conventional or modified papermaking techniques. Such fibrous webs are also not oriented but are basically isotropic and generally have like properties in all directions.

These fibrous webs normally comprise individualized overlapping and intersecting fibers and, in the case of the carded or oriented fibrous webs, have an average length of from about one-half inch to about 2½ inches or more. This range is, of course, most desirable and in most respects necessary when the starting fibrous materials are carded or oriented webs.

When the starting fibrous materials are isotropic webs derived from air-laying techniques or from conventional or modified papermaking techniques, shorter lengths of fibers may be employed provided they are of sufficient length to be handled in the subsequent fluid rearranging process. Usually, fiber lengths down to about one-quarter inch are capable of use, with shorter lengths of use by means of special handling techniques.

Other fibers of a natural, synthetic or man-made base or origin may be used in various proportions and various blends to partially replace the polyvinyl alcohol fibers. Such other fibers include cellulosic fibers such as cotton or rayon; polyamide fibers notably nylon 6 and nylon 6/6; polyester fibers such as "Dacron," "Fortrel," and "Kodel"; acrylic fibers such as "Acrilan," "Orlon," and "Creslan"; modacrylic fibers such as "Verel" and "Dynel"; polyolefinic fibers derived from polyethylene and polypropylene; cellulose ester fibers such as "Arnel" and "Acele," etc.

The denier of the synthetic fibers used in applying the principles of the present inventive concept may be selected from a relatively wide range of sizes. A denier range of from about 1 to about 3 is generally preferred for conventional commercial purposes, although for special purposes, deniers as low as one-half or as high as 5, 10, 15 or even more find utility in special cases.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

A carded fibrous web is prepared from dull, crimped polyvinyl alcohol fibers which are chemically treated and modified by a heat treatment and by reaction with formaldehyde. The fibers have the following properties and characteristics:

| | |
|---|---|
| Degree of formalization | 10% |
| Formalization treating time | 2 minutes |
| Denier | 1.32 |
| Tenacity (grams/denier) | 5.11 |
| Elongation (%) | 16.5 |
| Staple length (mm) | 35 |
| DFA (mol % by analysis) | 10.0 |

The carded fibrous web is exposed to fluid rearranging techniques similar to those set forth and illustrated in FIGS. 7–12 of Kalwaites U.S. Pat. No. 2,862,251 which issued Dec. 2, 1958.

A rearranged nonwoven fabric having fiber bundles and fabric apertures or openings is obtained. Formation of fiber bundles and fabric apertures or openings, however, is not well defined and is not commercially acceptable. It is believed that such unsatisfactory formation is due to the hydrophilicity of the fibers.

A materials balance determination of the weight of the product before rearranging and after rearranging indicates a substantial and commercially uneconomical loss of fiber weight during the rearranging process. Additionally, there is considerable evidence of autogenous bonding between the individual fibers, created presumably by the softening and adhering of such fibers as a result of the fluid rearranging process. Such bonding leads to undesirable loss of softness, hand, and drape.

The rearranged nonwoven fiber is economically and commercially unsatisfactory and unacceptable to industry.

EXAMPLE II

A carded fibrous web is prepared from dull, crimped polyvinyl alcohol fibers which are chemically treated and modified by a heat treatment and by reaction with formaldehyde. The fibers have the following properties and characteristics:

| | |
|---|---|
| Degree of formalization | 20% |
| Formalization treating time | 5 minutes |
| Denier | 1.32 |
| Tenacity (grams/denier) | 5.29 |
| Elongation (%) | 16.8 |
| Staple length (mm) | 35 |
| DFA (mol % by analysis) | 19.3 |

The carded fibrous web is exposed to fluid rearranging techniques similar to those set forth and illustrated in FIGS. 7–12 of Kalwaites U.S. Pat. No. 2,862,251 which issued Dec. 2, 1958.

A rearranged nonwoven fabric having fiber bundles and fabric apertures or openings is obtained. Formation of fiber bundles and fabric apertures or openings is well defined and is commercially acceptable. The materials balance determination of the weight of the product before rearranging and after rearranging is satisfactory and within commercially acceptable limits. There is substantially no evidence of autogenous bonding between the individual fibers. The nonwoven fabric has a high degree of softness, hand, and drape.

The rearranged nonwoven fabric is economically and commercially satisfactory and acceptable to industry.

EXAMPLE II-A

The procedures of Example II are followed substantially as set forth therein with the exception that the polyvinyl alcohol fibers are not crimped.

Fibrous lap and web formation is produced only with extreme difficulty because of lack of crimp and cohesiveness of the fibers. The fibrous laps and webs also split very badly when they are carded.

The difficulties were such as to render the use of uncrimped polyvinyl alcohol fibers commercially unsatisfactory and unacceptable to industry.

EXAMPLE II-B

The procedures of Example II are repeated substantially as set forth therein with the exception that the polyvinyl alcohol fibers have a degree of formalization of about 20.2%. The moisture regain of such fibers is about 10% at a temperature of 40° C. and a relative humidity of 90%.

The results are generally comparable to the results obtained in Example II.

EXAMPLE III

A carded fibrous web is prepared from dull, crimped polyvinyl alcohol fibers which are chemically treated and modified by a heat treatment and by reaction with formaldehyde. The fibers have the following properties and characteristics:

| | |
|---|---|
| Degree of formalization | 30% |
| Formalization treating time | 17 minutes |
| Denier | 1.39 |
| Tenacity (grams/denier) | 4.88 |
| Elongation (%) | 16.2 |
| Staple length (mm) | 35 |
| DFA (mol % by analysis) | 30.4 |

The carded fibrous web is exposed to fluid rearranging techniques similar to those set forth and illustrated in FIGS. 7–12 of Kalwaites U.S. Pat. No. 2,862,251 which issued Dec. 2, 1958.

A rearranged nonwoven fabric having fiber bundles and fabric apertures or openings is obtained. Formation of fiber bundles and fabric apertures or openings is well defined and is commercially acceptable. The materials balance determination of the weight of the product before rearranging and after rearranging is satisfactory and within commercially acceptable limits. There is substantially no evidence of autogenous bonding between the individual fibers. The nonwoven fabric has a high degree of softness, hand, and drape.

The rearranged nonwoven fabric is economically and commercially satisfactory and acceptable to industry.

EXAMPLE III-A

The procedures of Example III are followed substantially as set forth therein with the exception that the polyvinyl alcohol fibers are not crimped.

Fibrous lap and web formation is produced only with extreme difficulty because of lack of crimp and cohesiveness of the fibers. The fibrous laps and webs also split very badly when they are carded.

The difficulties were such as to render the use of uncrimped polyvinyl alcohol fibers commercially unsatisfactory and unacceptable to industry.

EXAMPLE III-B

The procedures of Example III are followed substantially as set forth therein with the exception that the polyvinyl alcohol fibers have a degree of formalization of about 32.2%. The moisture regain of such fibers is about 7½% at a temperature of 40° C. and a relative humidity of 90%.

The results are generally comparable to the results obtained in Example III.

EXAMPLE IV

A carded fibrous web is prepared from dull, crimped polyvinyl alcohol fibers which are chemically treated and modified by a heat treatment and by reaction with formaldehyde. The fibers have the following properties and characteristics:

| | |
|---|---|
| Degree of formalization | 40% |
| Formalization treating time | 2 hours |
| Denier | 1.38 |
| Tenacity (grams/denier) | 5.16 |
| Elongation (%) | 15.2 |
| Staple length (mm) | 35 |
| DFA (mol % by analysis) | 40.2 |

The carded fibrous web is exposed to fluid rearranging techniques similar to those set forth and illustrated in FIGS. 7–12 of Kalwaites U.S. Pat. No. 2,862,251 which issued Dec. 2, 1958.

A rearranged nonwoven fabric having fiber bundles and fabric apertures or openings is obtained. Formation of fiber bundles and fabric apertures or openings, however, it not well defined and is marginal but not commercially acceptable. It is believed that such unsatisfactory formation is due to the increased hydrophobicity of the fibers. The resulting appearance of the rearranged nonwoven fabric is not pleasing.

The rearranged nonwoven fabric is marginal but commercially unsatisfactory and unacceptable to industry.

EXAMPLE V

A carded fibrous web is prepared from dull, crimped polyvinyl alcohol fibers which are chemically treated and modified by a heat treatment and by reaction with formaldehyde. The fibers have the following properties and characteristics:

| | |
|---|---|
| Degree of formalization | 50% |
| Formalization treating time | 14 hours |
| Denier | 1.35 |
| Tenacity (grams/denier) | 5.43 |
| Elongation (%) | 16.0 |
| Staple length (mm) | 35 |
| DFA (mol % by analysis) | 48.0 |

The carded fibrous web is exposed to fluid rearranging techniques similar to those set forth and illustrated in FIGS. 7–12 of Kalwaites U.S. Pat. No. 2,862,251 which issued Dec. 2, 1958.

A rearranged nonwoven fabric having fiber bundles and fabric apertures or openings is obtained. Formation of fiber bundles and fabric apertures or openings, however, is not well defined and is not commercially acceptable. It is believed that such unsatisfactory formation is due to the increased hydrophobicity of the fibers. The resulting appearance of the rearranged nonwoven fabric is not pleasing.

The rearranged nonwoven fabric is commercially unsatisfactory and unacceptable to industry.

EXAMPLE VI

Polyvinyl alcohol fibers are treated with a conventional heat treatment at elevated temperatures and an insolubilizing step with formaldehyde to raise their wet-softening temperature and make them heat insensitive at a temperature of 150° C. (less than 10% shrinkage) and give them an average degree of acetalization of about 35 mol %.

A card web is prepared weighing 442 grams per square yard and comprising such heat-insensitive, water-insoluble polyvinyl alcohol fibers having a denier of 2½, a staple length of 38 mm. (1½ inch), and eight crimps per inch. The polyvinyl alcohol fibers have a moisture regain of 7.8% at a temperature of 40° C. and a relative humidity of 90%.

This fibrous card web is exposed to fluid rearranging techniques in the apparatus illustrated in FIGS. 7–12 of U.S. Pat. No. 2,862,251 and the fibers are rearranged into a predetermined pattern of fabric apertures and fiber bundles.

The apertured nonwoven textile fabric is bonded with National Starch NS4260, a non-ionic, cross-linking acrylic resin. The final weight of the bonded nonwoven textile fabric, after drying and curing, is 532 grains per square yard.

Physical tests show that the nonwoven textile fabric made of polyvinyl alcohol fibers is exceptionally strong in both the machine direction and cross direction, both in the dry and wet conditions.

good. Its elongation and its bulk are comparable to similar products made of rayon fibers.

The product is of use as a facing for absorbent products such as diapers. In a lighter weight, it is of use as a facing for sanitary napkins.

EXAMPLE VII

The procedures of Example VI are followed substantially as set forth therein with the exception that the polyvinyl alcohol fibers have a denier of 1.4, rather than 2½. The results are generally comparable.

EXAMPLE VIII

The procedures of Examples VI and VII are followed substantially as set forth therein with the exception that the polyvinyl alcohol fibers do not possess any substantial crimp. Web formation is rendered extremely difficult; there is a lack of cohesiveness and laps split badly when the fibers are carded.

EXAMPLE IX

The procedures of Example VI are followed substantially as set forth therein with the exception that the acetalization with formaldehyde is carried out to a much higher degree. The average degree of acetalization of the polyvinyl alcohol fibers is approximately 70 mol %. The moisture regain of such fibers is low and is less than 6% at 40° C. and a relative humidity of 90%. Such fibers tend to exhibit a greater degree of hydrophobicity and do not respond satisfactorily to applied fluid forces exerted during the fluid rearranging techniques disclosed in FIGS. 7–12 of U.S. Pat. No. 2,862,251.

EXAMPLE X

The procedures of Example VI are followed substantially as set forth therein with the exception that the acetalization with formaldehyde is carried out to a much lower degree. The average degree of acetalization of the polyvinyl alcohol is only about 9 mol %. The moisture regain of such fibers is very high and is greater than 12% at 40° C. and a relative humidity of 90°. Such fibers tend to exhibit a greater degree of hydrophilicity and do not respond satisfactorily to applied fluid forces

TABLE II

| Tensile Strength - Dry Thwing Albert - 3 ply | Machine Direction (Pounds) | Cross direction (Pounds) |
|---|---|---|
| | 38.1 | 6.8 |
| | 38.9 | 7.0 |
| | 39.1 | 7.2 |
| | Average 38.7 | 7.0 |
| Tensile Strength - Wet Thwing Albert - 3 ply | Machine Direction (Pounds) | Cross Direction (Pounds) |
| | 28.7 | 5.6 |
| | 29.1 | 5.2 |
| | 26.6 | 5.2 |
| | Average 28.13 | 5.33 |
| Tensile Strength - Cross Direction Instron - 1 ply (Pounds) | | |
| | 2.02 | |
| | 2.20 | |
| | 1.80 | |
| | 1.93 | |
| | 1.90 | |
| | Average 1.97 | |

The softness of the nonwoven textile fabric is excellent. Its absorbency rate and absorbent capacity is very exerted during the fluid rearranging techniques disclosed in FIGS. 7–12 of U.S. Pat. No. 2,862,251. Additionally, a materials balance determination of the weight of the product before rearranging and after rearranging reveals a relatively large loss of fiber weight during the rearranging process. There is also undesirable evidence of autogenous bonding between the individual fibers which makes the product harsh, papery, and boardy, and lacking in softness, hand and drape.

EXAMPLE XI

The procedures of Example VI are followed substantially as set forth therein with the exception that benzaldehyde is used instead of formaldehyde in the insolubilizing treatment. The results are generally comparable and the resulting nonwoven textile fabrics are commercially acceptable.

EXAMPLE XII

The rearranged nonwoven fabric manufactured in accordance with the general procedures of Example I is fabricated into a disposable, throw-away, ground coffee filter ring or infusion bag used in the brewing of coffee in a coffee percolator. The water in the percolator is heated to vigorous boiling, percolation of the boiling water takes place, and the coffee is prepared in the presence of the boiling water and associated steam. The disposable, throw-away ground coffee filter ring is substantially undamaged by such exposure to such elevated temperatures of 100°C. and slightly above.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. Apertured nonwoven textile fabrics having a predetermined pattern of fabric apertures and fiber bundles created by applied fluid forces comprising crimped, heat-insensitive, water-insoluble polyvinyl alcohol fibers having from about six to about 16 crimps per inch, a wet softening temperature of at least about 110°C., a dry heat softening temperature of at least about 210°C., and an average degree of acetalization of from about 20 mol % to about 35 mol %.

2. Apertured nonwoven textile fabrics having a predetermined pattern of fabric apertures and fiber bundles created by applied fluid forces comprising heat-insensitive water-insoluble polyvinyl alcohol fibers having from about six to about 16 crimps per inch, a wet softening temperature of at least about 110°C., a dry heat softening temperature of at least about 210°C. an average degree of acetalization of from about 20 mol % to about 35 mol %, and a moisture regain of from about 10% to about 7½% at a temperature of 40°C. and a relative humidity of 90%.

3. An infusion bag adapted to be used in the presence of boiling water and associated steam at a temperature of 100°C. and slightly higher prepared from the apertured nonwoven textile fabric defined in claim 1.

* * * * *